Patented Dec. 10, 1935

2,023,877

UNITED STATES PATENT OFFICE 2,023,877

FLAVORING MATERIAL

Albert K. Epstein and Benjamin R. Harris, Chicago, Ill.

No Drawing. Original application August 15, 1930, Serial No. 475,634. Divided and this application December 14, 1932, Serial No. 647,216

10 Claims. (Cl. 99—11)

Our invention relates in general to an improved type of flavoring material and more in particular to a flavoring material adapted for imparting a flavor of the nature of butter flavors and the like to various types of foods. Our present invention is a division of our copending application, Serial No. 475,634, filed August 15, 1930, now Patent No. 1,945,347. There are many types of foods in which either a true butter flavor or a slightly modified butter flavor is desired. In general, such types of foods are baked flour products, cheese products, margarine and similar emulsion products, and the like. It has been known in the past that artificial butter flavors can be obtained by propagating certain types of lactic acid organisms in milk and similar media. The types of organisms which have the most desirable flavoring properties are selected by plating out mixed cultures and then propagated in the laboratory to produce larger batches with which the milk is inocculated. It is well known, however, that it is very difficult to propagate the type of organism which is responsible for the most pleasant odor. Even after a satisfactory organism has been isolated and propagated in sufficient quantities to produce a butterlike flavor in milk, for example, it is found that this organism will very soon be attenuated and the aroma will be lost. When this occurs, substantially the only flavoring present is that produced by a strong lactic acid. Although lactic acid is one of the flavors detected in butter, it is by no means the dominant one and lactic acid alone is entirely ineffective for the purpose.

The principal object of our present invention is the provision of improved means for imparting the most desirable aroma of a butterlike nature to food products.

Another object is the provision of an improved flavoring material which may be added to food materials in exceedingly small quantities to impart improved flavor and aroma thereto.

Another object is the provision of a flavoring substance of this character, the strength of which will not be impaired on long standing and which, when employed under the usual conditions found in the preparation of foods will not become lost.

Another object is the provision of an artificial butterlike flavor in foods in such a way that the flavor can be duplicated directly from one batch of food products to another.

Since the present means available for utilizing artificial butter flavors is capable of employment only by the skilled bacteriologist, it is a further object of our invention to provide flavoring substances capable of use in foods and adapted to be simply applied by substantially any one in the various food industries.

Other objects and features of the invention will be apparent from a consideration of the following description.

We have discovered a certain group of chemical compounds which have great utility in imparting a uniform flavor to foods and other culinary preparations. These substances are diketones of a certain group and all having the same general structural formula, which will be described more in detail hereinafter. We have found that when these substances are added to certain foods, a very improved butterlike flavor is obtained. Our copending application hereinabove described may be referred to for an explanation of the use of these substances in margarine. Our copending applications Serial No. 475,632, now Patent No. 1,945,345, and 475,633, now Patent No. 1,945,346, also may be referred to for a consideration of the use of our improved flavoring materials in cheese products and baked flour products respectively.

In all of these illustrative applications of the invention, we have found that it is possible by employing exceedingly small quantities of our substances to obtain a very desirable and uniform butterlike flavor so that the foods will either appear to resemble the best grades of creamery butter in taste and odor or will appear to have had a good grade of creamery butter employed as one of the constituents thereof.

The group of substances which we have employed with greatest satisfaction are diketones having the general structure

wherein R and R' represent ethyl, methyl, propyl, or similar groups, and in which the groups R and R' taken together contain at least two carbons but not more than six carbons, and wherein the carbonyl groups are adjacent to each other.

We have found that all of these substances possess certain flavoring value, but that they all differ slightly both in flavor and other characteristics. In general, the low carbon compounds are more volatile than the higher carbon compounds of the group, and also apparently those of higher carbon content can be used in smaller proportions. Most of these substances when prepared in concentrated form do not possess a pleasant odor, but when sufficiently diluted possess a very pleasing aroma. Some possess a delicate cream like odor, others have a slight caramel odor resembling the odor produced by certain types of lactic acid organisms of the Citrovorous group. Still other members of the group possess an odor in dilute solutions somewhat resembling fresh strawberries. We have found, however, that various combinations of the group may be made which give a very pleasant and desirable aroma to margarine, renovated butter, shortening materials, flour products, and other types of substances used in the culinary arts.

More specifically now with respect to the chemical characteristics of the substances themselves, we have demonstrated that only those coming within the group described are desirable for our purpose. We have found that compounds having more than eight carbons in the two R groups taken together of the molecule and in which the carboxyl groups are not adjacent to each other, are not suitable for the purpose of our invention. It appears from this and other data that the compound should not possess more than six carbon atoms in the two R groups taken together to secure the best results.

We have prepared these substances synthetically and use a predetermined quantity of various members of the group singly or in combination to impart flavor to oleaginous products such as margarine and other similar substances. Thus we have used among other substances of the group

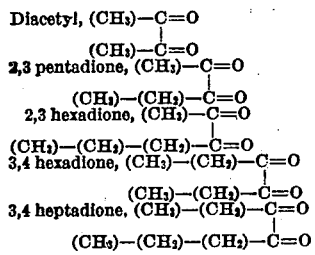

Any of these substances may be used individually, but we have found that we obtain the best results by combinations thereof. As an example, however, of some of the characteristics of these compounds, we found that five cubic centimeters of a 2% solution of 2,3 pentadione was sufficient to flavor one hundred pounds of margarine, while ten to twelve cubic centimeters of 2% solution of diacetyl was necessary to impart the desired aroma to one hundred pounds of margarine. In general, the higher members of the above described diketone group can be used in much smaller amounts than the lower members of the group.

When these substances are used, for example with cheese, they will impart to the cheese a very pronounced butterlike flavor, the specific manner of using them being determined by the cheese which is treated. Assume, for example, that a two-hundred pound batch of general type of cheese is to be provided with a butterlike flavor. The cheese is then treated to pasteurize it by raising it to the proper temperature with continual stirring, and the diketone flavoring substances of our invention are then intimately mixed with the cheese in the stirring apparatus. With cottage cheese, the cheese is preferably washed several times with water, thus removing the whey, and substantially all of the flavoring constituents. This washing, however, removes the fermenting organisms and enzyms which are responsible for the ripening of the cheese and thus the ripening is arrested at the most satisfactory stage. The cheese may be treated then with our flavoring substances to impart a better flavor to it than it had in its natural condition with the flavoring substances produced naturally as a result of the fermentation. For other features of the use of the invention with cheese, those skilled in the art are referred to our co-pending application.

When employing the flavoring compounds with baked flour products, a very pronounced butterlike flavor may be obtained without employing any butter at all in the product, lard or other similar type of shortening material being employed, if necessary. When the substances are used with baked flour products, it is preferable to employ a mixture because by this mixture we have found that the more volatile of the diketones may be fixed so as not to be driven off entirely during the baking step.

As previously stated, we found that certain combinations of various members of the group give the most desired bouquet. It appears that while one member of the group may have a more desirable butter flavor, another member of the group used in combination therewith will have the effect of intensifying or fixing the aroma of the first one of the group, and producing a desired blend. Among the combinations which we found very satisfactory was a combination of three parts of diacetyl with one-fourth part of 2,3 pentadione, or three parts of diacetyl with one-fourth part of 2,3 hexadione. These proportions are incorporated in a suitable solution to obtain the best results.

When the flavoring substances of our invention are produced synthetically, they are obtained in a relatively concentrated form, but in this condition possess a very penetrating and somewhat disagreeable odor. It is found that they must be present in quite dilute condition in order to obtain the most satisfactory results. If the solution is too concentrated these substances have the ability to penetrate other substances which may be near them, and so as far as commercial use or offering them to the trade is concerned, they would be unsatisfactory. The flavoring power of the substances is so exceedingly great that from two to five parts per million is ample to impart a strong butterlike flavor to margarine. We accordingly produce the substances in the form of comparatively weak solutions and offer them to the trade in this way. The substances so prepared possess a yellow color with a slightly greenish cast.

Each one of the members of the group outlined above has slightly different solubility characteristics. In general, however, the commonest of these substances are found to be approximately 4 to 6% soluble in water, possess considerably greater solubility in oleaginous substances, depending upon a number of conditions, and are soluble in almost all proportions in alcohol and similar solvents. The solution produced therefore, will depend to some extent upon the type of solvent employed. We have found that in vending our substances to the trade, the solution should not be more than about a 10% solution to obtain the best results. There is really no minimum except that dictated by common sense, as even in a solution of $\frac{1}{10}$ of 1%, some flavoring power exists. For all practical purposes, we have found that a 2% solution of our substances in water is very satisfactory. This is particularly true since we have developed a process for the production of our substances which yields a 2% solution and enables us to produce the compound in a condition to be offered to the trade much more economically.

Now in connection with the use of diketones in substances having an aqueous content which may become partially separated so as to wash out the flavoring materials, we have found that we can employ diketones having a relatively higher carbon content. We have found that as the carbon content increases in the class of substances set out, the solution in water becomes increasingly more difficult. Not only are the higher substances somewhat more difficultly soluble than the lower molecular weight substances in aqueous media, but it is found that when a combination is employed, the higher molecular weight substances have a tendency to improve and fix the flavor imparted by the lower molecular weight substances. This means that not only is the product improved in flavor, but when the process is carried out with a substance of the character indicated, for example margarine, there is less tendency toward washing out the higher carbon compounds and combination thereof than the relatively lower carbon substances.

Since the substances of our invention possess their flavoring properties only when used in relatively small proportions, we have found that a suitable solution of either one or a group of substances is very satisfactory for commercial use. The solvents employed may be aqueous, oleaginous, spirit (alcohol), or the like. This includes the incorporation of the flavoring compounds with solid fatty products which may be substances purely oleaginous in character or may be emulsions of oleaginous and aqueous substances, in which case the diketones may be dissolved in both the oleaginous and aqueous portions of the emulsion.

Referring more particularly to oleaginous materials, these may, of course, be liquid oils or solid fats. The liquid oils may be used in the culinary arts where a liquid substance is most desirably employed. Examples are pastry compositions, and the like. It may be found desirable also to employ a liquid oil solution in the manufacture of emulsions, like margarine, but in general we have found that satisfactory results are obtainable in this class of material by the use of the aqueous solutions. Proprietary fatty compositions such as hydrogenated vegetable oils, fats of animal origin, and the like, sold on the market as shortening materials, may also contain relatively small amounts of our flavoring substances in solution. Some substances of this character contain relatively small amounts of moisture and in a sense may be considered emulsions, although our substances may be used with these materials. We have found that instead of producing pure diketones and then dissolving them in solid fats, we can employ water extracts thereof which can be produced with present processes somewhat more economically, and then introduce the water extract directly into the solid fat with considerable agitation. The small amount of water present in this case will not be sufficient to introduce more than a trace of moisture so that the fat composition will still be in a practical sense a clear fat.

When the products of our invention are incorporated in a solvent, in general we prefer approximately a 2% solution to obtain the most desirable results. In some cases, however, it will be preferable to employ a very much weaker solution. This is particularly true when the substances of our invention are to be incorporated with solid fats which are used customarily in relatively large proportions for shortening purposes, for example. If a large amount of shortening is used, and the substances of our invention were present as 2% of the whole, too strong a butter-like flavor would result. For ordinary shortening materials, therefore, the amount should be somewhat less.

Since shortening materials such as solid hydrogenated vegetable oils are used largely in baking, we prefer to employ in such fats a group of our compounds, as we have found (as disclosed in our copending application relating to baked flour products) that the relatively higher diketones are less volatile and will tend to prevent too rapid volatilization of the lower diketones. An example of a suitable mixture for shortening materials to be used for baking purposes is three parts of diacetyl and one part of 2,3 pentadione. Another specific example would be two and one-half parts of diacetyl and three-quarters of a part of hexadione. Similarly good results may be obtained with two parts of diacetyl, one-half part of 2,3 pentadione and one-half part of ⅔ hexadione. The strength of the solution is determined by the use to which the solution is to be put. For example, in margarine, the flavoring substances of our invention are effective when present in proportions as small as one one-hundredth of one per cent. When the substances are employed in baked flour products, however, there is some volatilization, the exact amount depending upon the baked flour product itself, the temperature at which it is baked, and the like. For most purposes, if the total amount of diketone present in the shortening material is one tenth of one per cent., it will be found that a very strong butter flavoring is imparted to the final baked flour product. In general, however, it is preferred that the shortening material have only slightly greater flavoring effect than ordinary creamery butter, and a solution of between one fiftieth of one per cent. and one one-hundredth of one per cent. is the most suitable for ordinary commercial purposes.

What we claim as new and desire to protect by Letters Patent of the United States is:

1. A flavoring composition comprising a solution of diacetyl and another diketone having the general structure

wherein R and R' represent ethyl, methyl, propyl or similar groups, and taken together contain not less than four carbons, nor more than six, and in which the carbonyl groups are adjacent to each other, in a solvent.

2. A flavoring composition comprising an aqueous solution of diacetyl and another diketone having the general structure

wherein R and R' represent methyl, propyl, or similar groups, and taken together contain not less than four carbons, nor more than six, and in which the carbonyl groups are adjacent to each other.

3. A flavoring composition comprising an organic solvent having dissolved therein a proportion of diacetyl and another diketone having the general structure $$\begin{matrix} R-C=O \\ R'-C=O \end{matrix}$$

wherein R and R' represent ethyl, methyl, propyl or similar groups, and taken together contain not less than four carbons, nor more than six, and in which the carbonyl groups are adjacent to each other.

4. A flavoring composition comprising an oleaginous substance having dissolved therein a proportion of diacetyl and another diketone having the general structure $$\begin{matrix} R-C=O \\ R'-C=O \end{matrix}$$

wherein R and R' represent ethyl, methyl, propyl or similar groups, and taken together contain not less than four carbons, nor more than six, and in which the carbonyl groups are adjacent to each other.

5. A flavoring composition comprising a proportion of diacetyl and another diketone selected from a class having the general structure $$\begin{matrix} R-C=O \\ R'-C=O \end{matrix}$$

wherein R and R' represent ethyl, methyl, propyl or similar groups, and taken together contain not less than four carbons nor more than six, and in which the carbonyl groups are adjacent to each other.

6. A flavoring composition comprising a solution of a mixture of diketones having the general structure $$\begin{matrix} R-C=O \\ R'-C=O \end{matrix}$$

wherein R and R' represent ethyl, methyl, propyl or similar groups, and taken together contain not less than two carbons nor more than six, and in which the carbonyl groups are adjacent to each other.

7. A flavoring composition comprising a solvent having dissolved therein a proportion of the diketone diacetyl and another diketone having the formula $$\begin{matrix} R-C=O \\ R'-C=O \end{matrix}$$

wherein R and R' represent ethyl, methyl, propyl or similar groups, and taken together contain not less than four carbons, nor more than six, and in which the carbonyl groups are adjacent to each other, the proportion of diacetyl being greater than the proportion of the other diketone.

8. A flavoring composition comprising approximately three parts of diacetyl and approximately one part of 2,3 pentadione dissolved in a solvent.

9. A flavoring composition comprising approximately two and one-half parts of diacetyl to about three-fourths of one part of hexadione dissolved in a solvent.

10. A flavoring composition comprising approximately two parts of diacetyl to one-half part of 2,3 pentadione and one-half part of 2,3 hexadione dissolved in a solvent.

ALBERT K. EPSTEIN.
BENJAMIN R. HARRIS.